US009657723B1

(12) United States Patent
Iyer

(10) Patent No.: US 9,657,723 B1
(45) Date of Patent: May 23, 2017

(54) CARBON NANOTUBE-BASED FLUIDIZED BED HEAT TRANSFER MEDIA FOR CONCENTRATING SOLAR POWER APPLICATIONS

(71) Applicant: LOCKHEED MARTIN CORPORATION, Bethesda, MD (US)

(72) Inventor: Jyotsna Iyer, Saratoga, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 260 days.

(21) Appl. No.: 14/668,802

(22) Filed: Mar. 25, 2015

Related U.S. Application Data

(60) Provisional application No. 61/970,833, filed on Mar. 26, 2014.

(51) Int. Cl.
*F03G 6/06* (2006.01)
*F27B 15/02* (2006.01)
*F22B 31/00* (2006.01)

(52) U.S. Cl.
CPC ............ *F03G 6/06* (2013.01); *F22B 31/0007* (2013.01); *F27B 15/02* (2013.01); *C01B 2202/00* (2013.01); *Y02E 10/46* (2013.01)

(58) Field of Classification Search
CPC . F03G 6/00–6/68; F03G 2006/006–2006/062; F24J 2/00–2/5431; F24J 2002/003–2002/5496; Y02E 10/40–10/47; F23C 2206/00–2206/103; F23C 10/00–10/32; F23C 13/00–13/08; F23G 2203/50–2203/505; F27B 15/00–15/20; B01J 8/18; B01J 8/24; B01J 8/26; B01J 8/28; B01J 8/30; B01J 8/32;
(Continued)

(56) References Cited

U.S. PATENT DOCUMENTS

| 4,038,557 A * | 7/1977 | Gildersleeve, Jr. ........ F02C 1/05 159/DIG. 3 |
| 2003/0129122 A1* | 7/2003 | Chen ...................... B82Y 30/00 423/447.3 |

(Continued)

*Primary Examiner* — Phutthiwat Wongwian
*Assistant Examiner* — Laert Dounis
(74) *Attorney, Agent, or Firm* — McDermott Will & Emery LLP

(57) ABSTRACT

Withdrawing thermal energy obtained from a focused input of solar radiation can be complicated by issues associated with heat transfer media presently used for this purpose. By disposing carbon nanotubes on a fluidizable support and utilizing the carbon nanotubes as a fluidizable heat transfer medium, improved heat transfer characteristics can be realized due to the near-blackbody thermal absorption properties of the carbon nanotubes, in addition to other provided advantages. Concentrating solar power systems can include: a solar receiving structure configured to receive a focused input of solar radiation, a fluidized bed heat transfer medium within the solar receiving structure, and an energy-generating structure in thermal communication with the fluidized bed heat transfer medium. The fluidized bed heat transfer medium contains a plurality of fluidizable heat transfer particles, and the fluidizable heat transfer particles include a plurality of carbon nanotubes bonded to a plurality of fluidizable particles.

20 Claims, 2 Drawing Sheets

(58) Field of Classification Search
CPC ......... B01J 8/34; B01J 8/36; B01J 8/38; B01J
8/40; B01J 8/42; B01J 8/44; B01J 8/46;
F22B 31/0007; F22B 31/0015; F22B
31/0023; F22B 31/003; F22B 31/0046;
F22B 31/0053; F22B 31/0061; F22B
31/0069; F22B 31/0076; F22B 31/0084;
F22B 31/0092
USPC .................. 60/641.8–641.15; 126/561–714;
110/245; 422/139–147; 122/4 D;
165/104.16; 432/58
See application file for complete search history.

(56) References Cited

U.S. PATENT DOCUMENTS

| | | | | |
|---|---|---|---|---|
| 2004/0151654 | A1* | 8/2004 | Wei | B01J 8/0055 |
| | | | | 423/447.3 |
| 2009/0260360 | A1* | 10/2009 | Penciu | F01K 3/18 |
| | | | | 60/641.15 |
| 2009/0293516 | A1* | 12/2009 | Midttun | F01K 25/10 |
| | | | | 62/119 |
| 2011/0042040 | A1* | 2/2011 | Tantolin | F28D 15/043 |
| | | | | 165/104.16 |
| 2011/0185728 | A1* | 8/2011 | Meyers | F24J 2/07 |
| | | | | 60/641.11 |
| 2013/0257056 | A1* | 10/2013 | Ma | F03G 6/065 |
| | | | | 290/52 |
| 2014/0162131 | A1* | 6/2014 | Friend | H01M 4/583 |
| | | | | 429/231.8 |

\* cited by examiner

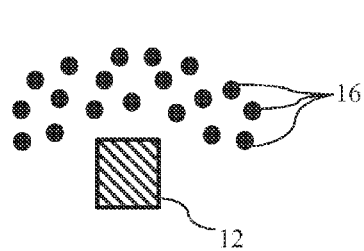 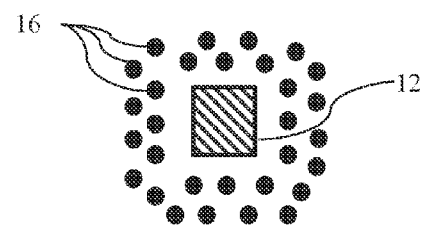
FIGURE 2A  FIGURE 2B
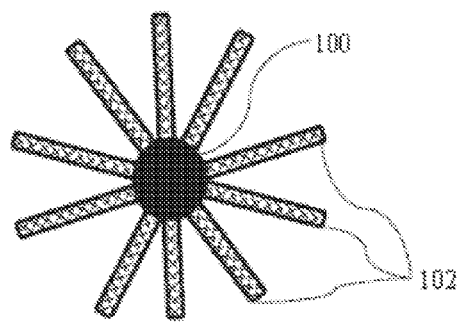
FIGURE 3

CARBON NANOTUBE-BASED FLUIDIZED BED HEAT TRANSFER MEDIA FOR CONCENTRATING SOLAR POWER APPLICATIONS

CROSS-REFERENCE TO RELATED APPLICATIONS

This application claims the benefit of priority under 35 U.S.C. §119 from U.S. Provisional Patent Application 61/970,833, filed on Mar. 26, 2014 and incorporated herein by reference in its entirety.

STATEMENT REGARDING FEDERALLY SPONSORED RESEARCH OR DEVELOPMENT

Not applicable.

FIELD

The present disclosure generally relates to solar energy, and, more specifically, to systems and methods that transfer thermal energy from a focused input of solar radiation to a fluidized bed heat transfer medium.

BACKGROUND

The drive for sources of low-cost, renewable and environmentally friendly power has stimulated considerable interest in solar energy and its conversion into more usable forms. The technology landscape in solar energy utilization has largely focused upon two principle technologies: 1) photovoltaic cells, in which solar radiation is directly converted into electricity, and 2) thermal utilization strategies, in which the thermal energy from substantially unfocused or minimally focused solar radiation is utilized for domestic heating purposes. Both approaches have merit, but they have yet to make a significant dent in the use of fossil fuels and other non-renewable energy sources. Photovoltaic cells remain expensive, have a limited lifetime, and offer a low quantum yield of photons into electricity. Although thermal utilization strategies have been used on a small scale for water or home heating purposes, they have yet to enjoy widespread implementation on a large scale.

A third strategy for utilizing solar energy involves receiving a focused input of solar radiation and converting the significant thermal energy therein into electricity. Such thermal conversion strategies are often referred to as concentrating solar power (CSP) techniques, in which concentrating optics provide the focused input of solar radiation to a solar collector of relatively small area. In such CSP equipment and techniques, the thermal energy received from the focused input of solar radiation is collected in a heat transfer medium and transferred to an energy-generating structure coupled to a turbine system or generator. Illustrative CSP equipment includes parabolic trough solar receivers, Fresnel or flat mirror solar receivers, and solar receiving towers.

Since very high temperatures can be generated at the location where the solar radiation is focused within CSP equipment and methods, thermally stable materials are needed for forming the heat transfer medium. Molten salts, particularly molten nitrate salts, have commonly been used for this purpose. However, molten salt heat transfer media can present a number of operational issues including, for example, corrosiveness, limited thermal stability, and engineering challenges arising from the freezing and thawing (contraction and expansion) cycles that occur following sunset and sunrise, respectively. In order to address these issues and others, relatively robust and expensive construction materials may be needed for building CSP equipment in which a molten salt heat transfer medium is used.

In view of the foregoing, improved systems and methods for concentrating thermal energy from solar radiation and obtaining power therefrom would be of significant interest in the art. The present disclosure satisfies these needs and provides related advantages as well.

SUMMARY

In various embodiments, the present disclosure describes concentrating solar power systems containing: a solar receiving structure configured to receive a focused input of solar radiation, a fluidized bed heat transfer medium within the solar receiving structure, and an energy-generating structure in thermal communication with the fluidized bed heat transfer medium. The fluidized bed heat transfer medium contains a plurality of fluidizable heat transfer particles, in which the fluidizable heat transfer particles contain a plurality of carbon nanotubes bonded to a plurality of fluidizable particles.

In other various embodiments, the present disclosure provides methods that include: receiving a focused input solar radiation upon a solar receiving structure, circulating a fluidized bed heat transfer medium into and out of the solar receiving structure, absorbing thermal energy received from the focused input of solar radiation onto the fluidized bed heat transfer medium, and transferring at least a portion of the thermal energy from the fluidized bed heat transfer medium to an energy-generating structure in thermal communication with the fluidized bed heat transfer medium. The fluidized bed heat transfer medium contains a plurality of fluidizable heat transfer particles, in which the fluidizable heat transfer particles contain a plurality of carbon nanotubes bonded to a plurality of fluidizable particles.

The foregoing has outlined rather broadly the features of the present disclosure in order that the detailed description that follows can be better understood. Additional features and advantages of the disclosure will be described hereinafter. These and other advantages and features will become more apparent from the following description.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein:

FIGS. 1, 2A and 2B show illustrative schematics of a solar receiving tower concentrating solar power system that is configured to utilize a fluidized bed heat transfer medium; and FIG. 3 shows an illustrative schematic of a particle having vertically aligned carbon nanotubes bonded thereto.

DETAILED DESCRIPTION

Figure 1:
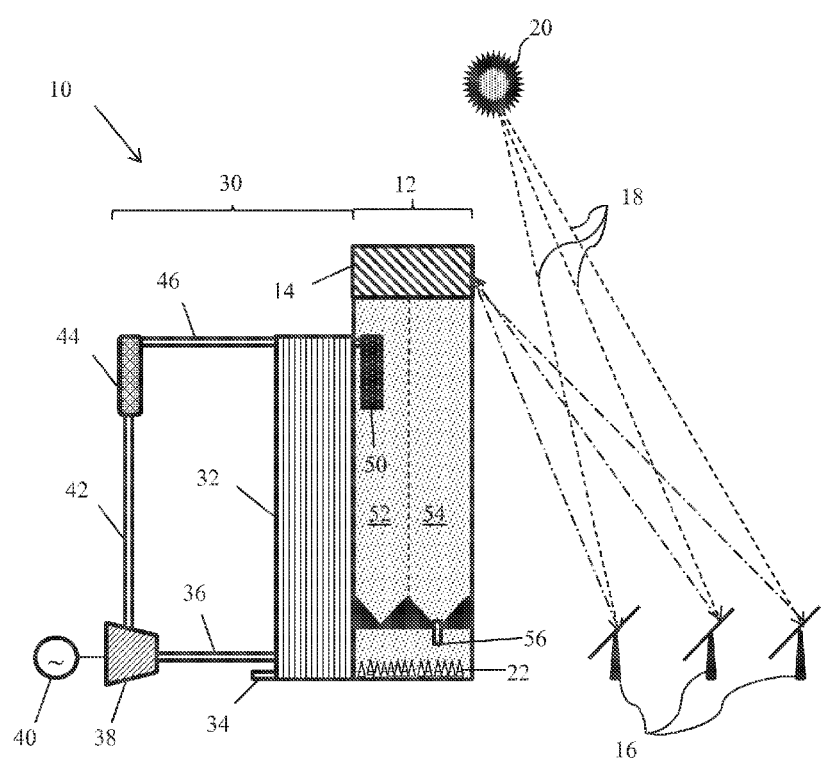

The present disclosure is directed, in part, to concentrating solar power (CSP) systems utilizing a fluidized bed heat transfer medium containing carbon nanotubes bonded to fluidizable particles. The present disclosure is also directed, in part, to methods for transferring thermal energy using a fluidized bed heat transfer medium containing carbon nanotubes bonded to fluidizable particles.

As discussed above, there are several approaches available for harvesting thermal energy from a focused input of solar radiation, and converting the concentrated thermal energy into electricity. Although molten salts can be used as a heat transfer medium in this regard, they present a number of engineering challenges and associated cost barriers that have slowed the progress of this technology.

The present inventor recognized that by replacing a molten salt heat transfer medium with a fluidized bed heat transfer medium in a CSP system, a number of the issues associated with the molten salts can be overcome. With a fluidized bed heat transfer medium, there is no issue of freezing and thawing upon sunset and sunrise, respectively. That is, by utilizing a fluidized bed heat transfer medium that is thermally stable and has a sufficiently high melting point, the heat transfer medium can remain in solid form at all times, thereby overcoming the contraction and expansion cycles that can accompany daily startup and shutdown within molten salt systems. In addition, by choosing a fluidizable heat transfer medium with a sufficiently high melting point and thermal stability, the operable working range of the CSP system can be increased, thereby allowing a greater quantity of thermal energy to be withdrawn for conversion into electricity. Moreover, the corrosiveness issues associated with molten salt heat transfer media can be overcome by utilizing a fluidized bed heat transfer medium. As a collective result, a fluidized bed heat transfer medium can allow less expensive materials to be used for constructing CSP systems, thereby improving the overall economics of electricity generation.

More specifically, the inventor recognized that by making use of the near-blackbody thermal absorption properties of carbon nanotubes in an appropriate fluidizable form, very efficient withdrawal of thermal energy from a focused input of solar radiation can be realized through increasing the radiative heat transfer capabilities of a fluidized bed heat transfer medium. Carbon nanotubes display very high absorption of electromagnetic radiation over a wide wavelength range. For example, the absorption of carbon nanotubes in a wavelength range between about 300 nm to about 2500 nm is nearly constant, with about 95% or more of the incident electromagnetic radiation being absorbed. Conventional absorptive materials, in contrast, often display a significantly lower degree of absorption, particularly outside the visible region of the electromagnetic spectrum. Although the thermal absorption properties of carbon nanotubes are a relatively well known characteristic of these materials, substrate-free individual or bundled carbon nanotubes (i.e., "loose" carbon nanotubes) are not readily fluidizable as solid particles and are considered to be insufficient for producing a fluidized bed.

Some synthetic processes directly grow carbon nanotubes on particles that are fluidized during carbon nanotube growth, and the particle-bound carbon nanotubes remain fluidizable upon the completion of the growth process. The present inventor recognized that such fluidizable carbon nanotubes can be particularly well suited for use within a fluidized bed heat transfer medium in concentrating solar power systems and methods. Suitable fluidizable carbon nanotubes can include carbon nanotubes grown on porous silica particles in a fluidized bed process, such as those available from Southwest Nanotechnologies (SWeNT) of Norman, Okla. Carbon nanotubes of various types that are grown on other kinds of fluidizable particles, such as porous alumina and other porous ceramics, can also be suitable for this purpose, as discussed hereinbelow.

In various embodiments, concentrating solar power systems of the present disclosure can contain: a solar receiving structure configured to receive a focused input of solar radiation, a fluidized bed heat transfer medium within the solar receiving structure, and an energy-generating structure in thermal communication with the fluidized bed heat transfer medium. The fluidized bed heat transfer medium contains a plurality of fluidizable heat transfer particles, in which the fluidizable heat transfer particles include a plurality of carbon nanotubes bonded to a plurality of fluidizable particles.

As shown in FIG. 1 below, a flow pathway configured to circulate the fluidized bed heat transfer medium into and out of the solar receiving structure can be present. In more specific embodiments, a portion of the flow pathway can be present within the energy-generating structure. The flow pathway can establish thermal communication between the solar receiving structure and the energy-generating structure.

As used herein, the term "focused input of solar radiation" will refer to any process or structure that produces a higher flux of solar radiation at a given location compared to natural sunlight.

As used herein, the term "fluidized bed" will refer to a solid-fluid mixture that maintains fluid-like properties. In the case of the present disclosure, the solid-fluid mixture represents a gas-solid mixture, in which the solid particles containing carbon nanotubes are transported in a fluidizing gas.

Suitable fluidizing gases for producing a fluidized bed heat-transfer medium according to the embodiments of the present disclosure can include inert or substantially non-reactive gases such as, for example, helium, argon, neon, nitrogen and any combination thereof. The fluidizing gases can be maintained at a velocity greater than or equal to that needed to achieve fluidization of a particular type of fluidizable heat transfer particle being used in a given implementation of the present disclosure. Suitable fluidization velocities for a given type of fluidizable particle can be determined by one having ordinary skill in the art.

The solar receiving structure of the presently disclosed concentrating solar power systems can encompass a variety of forms. For example, the solar receiving structure can be a parabolic trough solar receiver, a Fresnel lens solar receiver, a flat mirror solar receiver, or a solar receiving tower system. The presently disclosed fluidizable heat transfer medium can be used to withdraw accumulated solar energy from a concentrating solar power system containing any of these types of solar receiving structures. The solar receiving structure can be configured to be compatible with the chosen type of concentrating solar power system and to accommodate the use of a fluidized bed heat transfer medium therein. The type of concentrating solar power system can, in turn, be chosen and configured based upon the amount of electrical power that is desired to be generated. Concentrating solar power systems containing a solar receiving tower, for example, can accommodate production of especially large quantities of electrical power.

In more specific embodiments, the concentrating solar power systems of the present disclosure can contain a solar receiving tower. The solar receiving tower can be configured to receive and circulate the fluidized bed heat transfer medium in order to collect accumulated solar energy and transfer it therefrom.

FIGS. 1, 2A and 2B show illustrative schematics of a solar receiving tower concentrating solar power system that is configured to utilize a fluidized bed heat transfer medium. As shown in FIG. 1, concentrating solar power system 10 includes solar receiving tower 12 topped by collector 14.

A plurality of heliostat mirrors 16, also referred to herein simply as heliostats or mirrors, are disposed at least partially around the perimeter of solar receiving tower 12 and are configured to focus solar radiation 18 from sun 20 onto solar receiving tower 12, specifically onto collector 14. Heliostat mirrors 16 can be located substantially upon a single side of solar receiving tower 12 (i.e., partially circumferentially), as depicted in FIG. 2A, or substantially about the entire perimeter of solar receiving tower 12 (i.e., circumferentially), as depicted in FIG. 2B. Heliostat mirrors 16 can also be configured to track the motion of sun 20 throughout the day and modify the mirror positioning with respect thereto so that a focused input of solar radiation onto collector 14 is maintained. Each heliostat mirror 16 can be positioned independently, taking into account its relative position with respect to solar receiving tower 12 and sun 20 at a given time, and the positioning can be maintained under appropriate computer control. Furthermore, the number and positioning of heliostat mirrors 16 around solar receiving tower 12 can be optimized to provide a desired degree of focused solar radiation input thereon. These and other considerations concerning heliostat mirrors 16 will be familiar to one having ordinary skill in the art.

Referring again to FIG. 1, solar receiving tower 12 is configured to circulate the fluidized bed heat transfer medium into and out of collector 14 in order to withdraw heat therefrom and to transfer the heat to energy-generating structure 30. Energy-generating structure 30 includes exchange conduit 32, in which heated particles of the heat transfer medium are received from optional particle feeder 22. Particle feeder 22 can include apparatuses such as, for example, a conveyer belt, a rotating screw feeder, a vibrational feeder, or any similar structure capable of conveying particulate matter. Particle feeder 22 is used to convey particles of the fluidized bed heat transfer medium that are no longer fluidized in a gas stream. In alternative embodiments, particle feeder 22 can be omitted, and the fluidized bed heat transfer medium can be maintained in continual fluid motion in order to reach exchange conduit 32. Although FIG. 1 has depicted energy-generating structure 30 as being partially abutted with solar receiving tower 12, it can also be spaced apart therefrom, if desired.

A fluidizing gas can be introduced to exchange conduit 32 via inlet 34 in order to upwardly convey therein the particles of the fluidized bed heat transfer medium. Along the way during their upward transit, the particles of the heat transfer medium give up at least a portion of their heat to water, which is then converted into steam and passed via line 36 to turbine 38. Line 36 can be connected to exchange conduit 32 at any suitable location to affect removal of steam therefrom. Turbine 38 is, in turn, coupled to generator 40, for production of electricity. In alternative configurations, turbine 38 can be a as turbine. The steam exiting turbine 38 is then passed via line 42 to condenser 44, where the water is re-liquefied. The water is then returned to exchange conduit 32 via line 46 in order to undergo a subsequent cycle of heat exchange. As with line 36, line 46 can also be connected to exchange conduit 32 at any suitable location for returning the condensed water thereto.

As indicated above, after or while giving up their accumulated heat to water or another suitable fluid, the particles of the fluidized bed heat transfer medium pass upwardly through exchange conduit 32. Upon reaching the top of exchange conduit 32, the particles pass into particle separator 50. Particle separator 50 can, for example, be configured to separate the particles from condensed water returning to exchange conduit 32. Likewise, particle separator 50 can affect separation of the particles from steam, especially if line 36 is located within the upper portions of exchange conduit 32. In another implementation, particle separator 50 can promote particle separation when the fluidizing gas velocity is higher than the particle fluidization velocity, thereby promoting more efficient use of the fluidizable heat transfer particles. Suitable types of particle separators will be familiar to one having ordinary skill in the art.

After transiting exchange conduit 32 and particle separator 50, the separated particles of the fluidized bed heat transfer medium enter cold silo 52 within solar receiving tower 12, in which they are again rendered into fluidized bed form. The fluidizing gas producing the fluidized bed in cold silo 52 can be that introduced from inlet 34 and passing through exchange conduit 32. The fluidized bed heat transfer medium then circulates through or adjacent to collector 14 in order to remove heat therefrom, and the heated particles subsequently pass to hot silo 54, also within solar receiving tower 12, where they can collect in a non-fluidized form, if desired. Hot silo 54 can dispense the heated and non-fluidized particles to particle feeder 22 via conduit 56. Optionally, a valve or other suitable flow control device can be present within conduit 56 in order to retain the heated particles within hot silo 54 until their dispensation is desired at a later time. Further optionally, the heated particles can remain in fluidized form in hot silo 54 and can be conveyed directly in fluidized form to exchange conduit 32, if desired, as discussed above.

As indicated above, suitable fluidizable heat transfer particles can include carbon nanotubes that are bonded to a plurality of fluidizable particles, such as silica particles. Other types of fluidizable particles can also be used in the systems and methods of the present disclosure. Suitable alternative fluidizable particles include those upon which carbon nanotubes can be successfully grown and which also have a sufficient degree of heat tolerance to withstand the operating temperatures produced by the focused input of solar radiation. Alternative fluidizable particles can include ceramic particles such as silicon carbide, boron carbide, alumina, magnesium oxide and the like. Combinations of the foregoing types of fluidizable particles can also be used in the various embodiments of the present disclosure. In various embodiments, suitable fluidizable particle can be porous in order to promote carbon nanotube growth.

Although carbon nanotubes can be produced on a number of substrate types, including various types and sizes of particles, it is to be recognized that not all of these particle-bound carbon nanotubes are necessarily fluidizable. Qualities promoting ready fluidization of particles having carbon nanotubes bonded thereto include constraining the particle size into a range from about 100 microns to about 1000 microns in size, and choosing particles that are substantially spherical in shape. As used herein, a particle will be considered to be substantially spherical in shape if the particle is at least ellipsoidal in shape with its principal axes differing in length by at most about 10% with respect to each other. In addition, a substantially spherical particle need not necessarily have a surface that is perfectly smooth. Instead, the outer surface of a particle can be defined by various crevices, channels, bulges, bumps and the like on a microscopic level while retaining a substantially spherical shape. Further, the fluidizable particles of the present disclosure can display at least some degree of porosity in order to promote carbon nanotube growth thereon.

In alternative variants of the present disclosure, smaller support particles (e.g., 10 microns-100 microns) can be agglomerated with one another to produce larger fluidizable particles (e.g., 100 microns-1000 microns) for carbon nanotube growth. Particle agglomeration can increase the porosity of the larger fluidizable particles, which can be desirable for promoting carbon nanotube growth.

In some embodiments, the carbon nanotubes can be vertically aligned with respect to a surface of the fluidizable particles. FIG. 3 shows an illustrative schematic of particle 100 having vertically aligned carbon nanotubes 102 bonded thereto. The carbon nanotubes that are bound and vertically aligned with respect to the surface of the fluidizable particles can be of any type or combination of types and can be produced by any suitable process. In illustrative embodiments, the carbon nanotubes can be single-walled carbon nanotubes, double-walled carbon nanotubes, multi-walled carbon nanotubes, or any combination thereof. The carbon nanotubes can be metallic, semimetallic, or semiconducting depending on their chirality. In addition, the carbon nanotubes can be grown to any length at which the particles remain fluidizable, such as exemplary carbon nanotube lengths of between about 1 micron and about 20 microns, or between about 20 microns and about 50 microns, or between about 50 microns and about 500 microns. In some embodiments, the carbon nanotubes bonded to the particles can be substantially uniform in length, and in other embodiments, the lengths of the carbon nanotubes can vary to any suitable degree.

In other various embodiments, the carbon nanotubes can be in the form of non-aligned bundles when grown on the surface of the fluidizable particles. Bundled carbon nanotubes can be formed when the growth density on the fluidizable particles is lower. Bundled carbon nanotubes can be defined by the same properties, discussed above, that are characteristic of vertically aligned carbon nanotubes. Even when carbon nanotubes are present in bundled form on a fluidizable particle, they can still provide excellent heat transfer properties.

In more particular embodiments, the carbon nanotubes can be grown on the fluidizable particles by a fluidized bed growth process. In some embodiments, the BLACKSAND carbon nanotube product produced by Southwest Nanotechnologies in a fluidized bed growth process represents an illustrative example of a suitable particle-bound form of carbon nanotubes that can be used as a fluidizable heat transfer medium. Such fluidized bed growth processes can include disposing a cobalt-molybdenum catalyst on the surface of the fluidizable particles to produce catalyst-loaded particles, and fluidizing the catalyst-loaded particles in a fluidized bed configuration under carbon nanotube growth conditions. Exemplary carbon nanotube growth conditions can include exposing the catalyst-loaded particles to a carbon feedstock at a temperature between about 600° C. and about 1000° C. to result in growth of carbon nanotubes on the surface of the particles. In some embodiments, growing the carbon nanotubes on the surface of the fluidizable particles in this manner can result in indirect carbon nanotube bonding via the deposited catalyst.

Accordingly, in various embodiments, methods of the present disclosure can include: receiving a focused input of solar radiation upon a solar receiving structure, circulating a fluidized bed heat transfer medium into and out of the solar receiving structure, absorbing thermal energy received from the focused input of solar radiation onto the fluidized bed heat transfer medium, and transferring at least a portion of the thermal energy from the fluidized bed heat transfer medium to an energy-generating structure in thermal communication with the fluidized bed heat transfer medium. The fluidized bed heat transfer medium contains a plurality of fluidizable heat transfer particles. The fluidizable heat transfer particles include a plurality of carbon nanotubes bonded to a plurality of fluidizable particles.

In various embodiments, the solar receiving structure can constitute a solar receiving tower, and the focused input of solar radiation can be received from a plurality of heliostat mirrors disposed at least partially around the perimeter of the solar receiving tower, as illustratively depicted in FIGS. 1, 2A and 2B.

In further embodiments, the methods of the present disclosure can include generating electricity within the energy-generating structure. In various embodiments, the energy-generating structure can include a turbine system, such as a steam turbine or a gas turbine.

In further embodiments, the methods of the present disclosure can further include circulating at least a portion of the fluidizable heat transfer particles through a flow pathway within the energy-generating structure. In some embodiments, the fluidized bed heat transfer medium can be continuously circulated into and out of the solar receiving structure while the focused input of solar radiation is being received. For example, with reference to FIG. 1, the fluidizable heat transfer medium can be continuously released from the hot silo rather than being retained therein. Continuous circulation can allow generated heat to be withdrawn on an ongoing basis for conversion into electricity. In other various embodiments, the fluidizable heat transfer medium can be continuously circulated through the location where the focused input of solar radiation is being received (i.e., collector 14 in FIG. 1), and a stockpile of non-fluidized heat transfer particles can accumulate in a location (e.g., hot silo 56 in FIG. 1) for release as needed to maintain a downstream fluidized bed. That is, during operation of the systems and methods described herein, an excess of the fluidizable heat transfer medium can be present such that the fluidized bed can be maintained, even if all of the heat transfer particles are not fluidized and circulating at a given time.

In stilt further embodiments, circulation of the fluidizable heat transfer medium can be stopped, and the heat transfer particles can be retained in a suitable location in order to store the heat locally within. Proceeding in this manner can allow electricity to be produced even on days when the solar exposure is limited or non-existent, or at nighttime, or at a time when electrical release to the grid is more desirable. For example, by transporting the accumulated heat transfer particles to the energy-generating structure at a desired time, the risk of inadvertently overloading the electrical grid with excess electrical power can be lessened.

Although the disclosure has been described with reference to the disclosed embodiments, those skilled in the art will readily appreciate that these only illustrative of the disclosure. It should be understood that various modifications can be made without departing from the spirit of the disclosure. The disclosure can be modified to incorporate any number of variations, alterations, substitutions or equivalent arrangements not heretofore described, but which are commensurate with the spirit and scope of the disclosure. Additionally, while various embodiments of the disclosure have been

What is claimed is the following:

1. A concentrating solar power system comprising:
   a solar receiving structure configured to receive a focused input of solar radiation;
   a fluidized bed heat transfer medium within the solar receiving structure, the fluidized bed heat transfer medium comprising a plurality of fluidizable heat transfer particles;
      wherein the fluidizable heat transfer particles comprise a plurality of carbon nanotubes bonded to a plurality of fluidizable particles; and
   an energy-generating structure in thermal communication with the fluidized bed heat transfer medium.

2. The concentrating solar power system of claim 1, wherein the fluidizable particles comprise silica particles, ceramic particles or any combination thereof.

3. The concentrating solar power system of claim 1, wherein the fluidizable heat transfer particles range from about 100 microns to about 1000 microns in size.

4. The concentrating solar power system of claim 1, wherein the fluidizable particles are substantially spherical in shape.

5. The concentrating solar power system of claim 1, wherein the solar receiving structure comprises a solar receiving tower.

6. The concentrating solar power system of claim 5, further comprising:
   a plurality of heliostat mirrors disposed at least partially around the perimeter of the solar receiving tower and that are configured to focus solar radiation onto the solar receiving tower.

7. The concentrating solar power system of claim 1, wherein the carbon nanotubes are vertically aligned with respect to a surface of the fluidizable particles.

8. The concentrating solar power system of claim 1, further comprising:
   a flow pathway configured to circulate the fluidized bed heat transfer medium into and out of the solar receiving structure, the flow pathway establishing the thermal communication with the energy-generating structure.

9. The concentrating solar power system of claim 8, wherein a portion of the flow pathway is within the energy-generating structure.

10. The concentrating solar power system of claim 8, wherein the energy-generating structure comprises a turbine system.

11. A method comprising:
    receiving a focused input of solar radiation upon a solar receiving structure;
    circulating a fluidized bed heat transfer medium into and out of the solar receiving structure, the fluidized bed heat transfer medium comprising a plurality of fluidizable heat transfer particles;
       wherein the fluidizable heat transfer particles comprise a plurality of carbon nanotubes bonded to a plurality of fluidizable particles;
    absorbing thermal energy received from the focused input of solar radiation onto the fluidized bed heat transfer medium; and
    transferring at least a portion of the thermal energy from the fluidized bed heat transfer medium to an energy-generating structure in thermal communication with the fluidized bed heat transfer medium.

12. The method of claim 11, further comprising:
    circulating at least a portion of the fluidizable heat transfer particles through a flow pathway within the energy-generating structure.

13. The method of claim 12, wherein the energy-generating structure comprises a turbine system.

14. The method of claim 11, wherein the fluidizable particles comprise silica particles, ceramic particles or any combination thereof.

15. The method of claim 11, wherein the fluidizable heat transfer particles range from about 100 microns to about 1000 microns in size.

16. The method of claim 11, wherein the fluidizable particles are substantially spherical shape.

17. The method of claim 11, wherein the solar receiving structure comprises a solar receiving tower and the focused input of solar radiation is received from a plurality of heliostat mirrors disposed at least partially around the perimeter of the solar receiving tower.

18. The method of claim 11, wherein the carbon nanotubes are vertically aligned with respect to a surface of the fluidizable particles.

19. The method of claim 18, wherein the carbon nanotubes are grown on the fluidizable particles in a fluidized bed growth process.

20. The method of claim 11, wherein the fluidized bed heat transfer medium is continuously circulated into and out of the solar receiving structure while the focused input of solar radiation is being received.

* * * * *